UNITED STATES PATENT OFFICE.

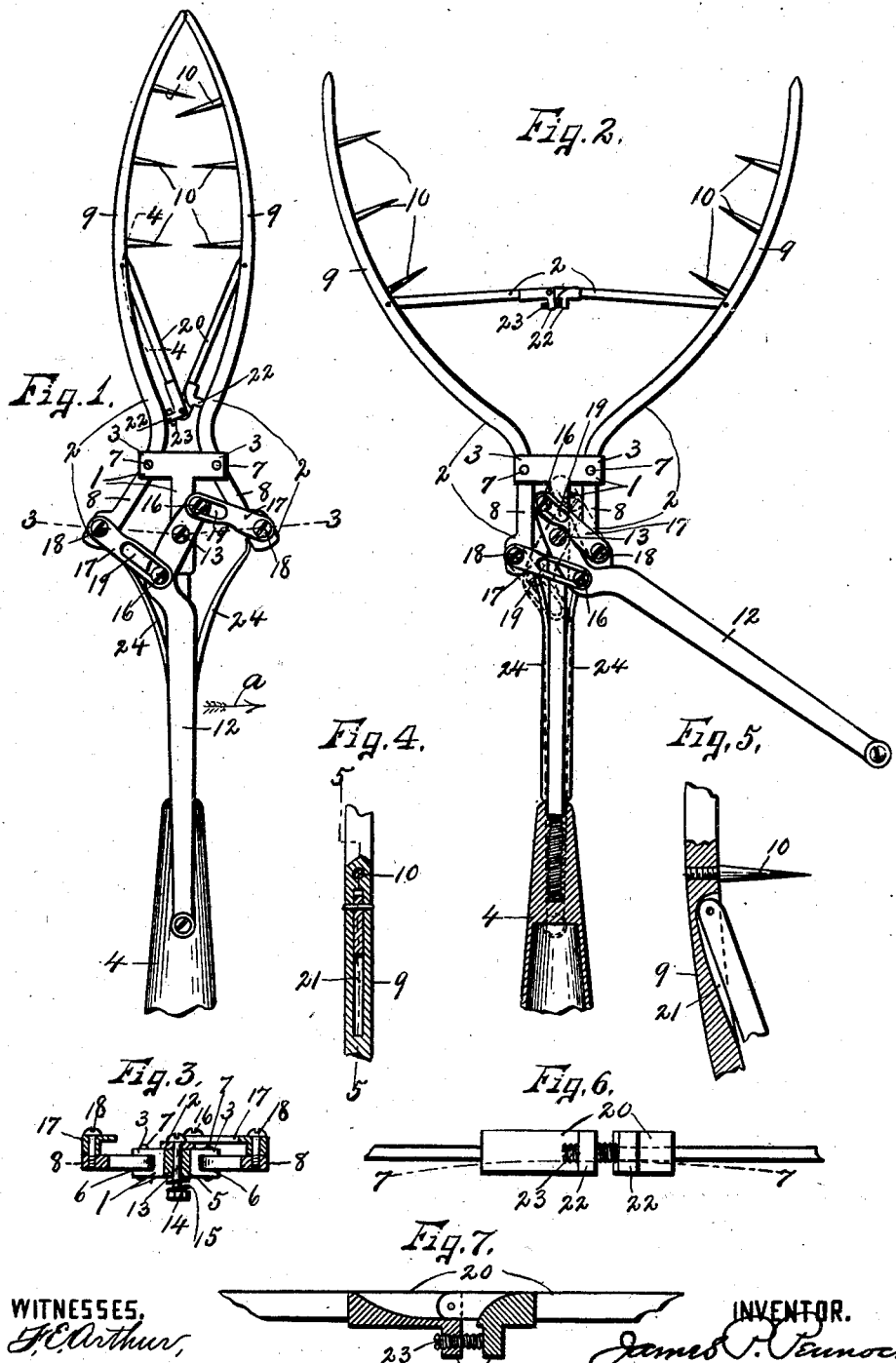

JAMES P. PENNOCK, OF SYRACUSE, NEW YORK.

FISH-GRAPPLE.

SPECIFICATION forming part of Letters Patent No. 671,294, dated April 2, 1901.

Application filed October 29, 1900. Serial No. 34,694. (No model.)

*To all whom it may concern:*

Be it known that I, JAMES P. PENNOCK, of Syracuse, in the county of Onondaga, in the State of New York, have invented new and useful Improvements in Fish-Grapples, of which the following, taken in connection with the accompanying drawings, is a full, clear, and exact description.

This invention relates to improvements in fish-grapples, the object being to provide a simple and practical device for catching fish which is positive and substantially automatic in action when closed upon a fish; and to this end the invention consists in the construction, combination, and arrangement of the component parts of a fish-grappling device, as hereinafter described, and pointed out in the claims.

Referring to the drawings, Figures. 1 and 2 are face views of my invention, the jaws being shown in their closed position in Fig. 1 and in their open position in Fig. 2. Figs. 3, 4, and 5 are sectional views taken, respectively, on lines 3 3 and 4 4, Fig. 1, and 5 5, Fig. 4. Fig. 6 is an enlarged inner face view of the adjacent ends of the toggle-links connecting the jaws of my improved grapple. Fig. 7 is a sectional view taken on line 7 7, Fig. 6.

Similar reference characters indicate corresponding parts in all the views.

This invention consists, essentially, of a support 1, oppositely-arranged jaws 2, pivotally connected to the support 1, operating mechanism for opening the jaws, means for holding the jaws in their open position, and additional means for automatically closing the jaws.

The support 1 may be of any desired form, size, or construction for supporting the jaws and the various mechanisms of my invention and preferably consists of a metallic shank formed of steel or other equivalent material and having one end provided with laterally-extending ears 3 and its opposite end threaded for receiving and engaging the threaded handle 4. The intermediate portion of the support between the ears 3 and its threaded end is provided with an aperture 5 for receiving a pivotal bolt, presently described. The ears 3 are each provided with slots 6, extending inwardly from their end faces for receiving the adjacent portions of the jaws, also presently described, and are formed with apertures for receiving pivotal pins 7, which serve to secure the jaws in position. The jaws 2 may also be of any desired form or construction and preferably consist of metallic arms having their intermediate portions arranged in the slots 6 of the support 1 and provided with apertures for receiving the pivotal pins 7, previously mentioned. These jaws extend in opposite directions from the pivotal pins 7 for forming oppositely-arranged arms 8 and 9, the arms 8 being connected to a suitable operating member, hereinafter described, and the arms 9 are usually arranged at an angle with the arms 8 and are provided with spurs 10, projecting inwardly from their inner faces. These arms 9 are usually curved outwardly from their opposite ends, and their free extremities are adapted to contact with each other for forming a suitable stop and limiting the inward movement of the jaws toward each other. The intermediate or outwardly-curved portions of the arms 9 are provided with recesses or slots extending inwardly from their adjacent faces for receiving and supporting the opposite ends of the toggle-links, presently described, and permitting the same to be folded upon the inner faces of the jaws when the same are moved toward each other. It is thus apparent that by curving the arms 9 outwardly in opposite directions from their opposite ends the same are made to conform more closely to the shape of the fish, and their free ends being arranged in closer proximity to each other when in the act of grappling the fish it is evident that the liability of release or escape of the fish is reduced to a minimum.

The spurs 10, as previously stated, project inwardly from the inner faces of the arms 9 and may be secured to said arms in any desired manner, preferably by providing the arms with threaded apertures and the spurs with threaded shanks, which are screwed into the apertures and then riveted or upset at their outer ends for positively securing the spurs in position. Any number of these spurs may be secured to the arms 9 and when placed in proximity to the free ends of the arms are generally arranged in staggered relation to each other, as seen in Fig. 1, in order that the spurs may be moved freely by each other without liability of contact.

The operating mechanism previously described for moving the jaws to their open position may also be of any desired construction, but preferably consists of a lever 12, pivotally connected to the support 1, and is preferably provided with an aperture alined with the aperture 5 in the support 1 and is held in position by the pivotal pin 13, passed through the aperture in the lever and support and having one end provided with a head engaged with the outer face of the lever and its other end extended beyond the support 1 and provided with an adjustable shoulder 14 and a spring 15, interposed between said shoulder and the adjacent face of the support 1 for holding the lever 12 in frictional engagement with the opposite face of the support 1.

Secured to the lever 12, at opposite sides of the pivot 13, are suitable studs 16, connected to which are oppositely-arranged links 17, having their outer ends pivotally connected at 18 to the adjacent free ends of the arms 8 and their inner ends formed with slots 19, which receive the projecting studs 16 and permit the lever 12 to be moved to its normal inoperative position when the jaws are open.

In the operation of opening the jaws the lever 12 is moved in the direction indicated by the arrow a. The studs 16 engage the outer end walls of the slots 17, thereby drawing the free ends of the arms 8 toward each other and forcing the arms 9 away from each other, whereupon the free ends of the jaws may be automatically locked by any desired means. This means preferably consists of a toggle connection 20, having the outer ends of its opposite links pivotally connected to the intermediate portions of the arms 9 and are preferably arranged within recesses or slots 21, previously mentioned. The adjacent ends of the toggle links or arms are hinged to each other and are provided with projecting shoulders 22, one of said shoulders being provided with a threaded aperture for receiving a threaded adjusting-screw 23, one end of which is adapted to engage the shoulder of the opposite arm for permitting said adjacent ends to move any desired distance beyond a straight line drawn between the pivotal connections of said toggle-links to the arms 9. These shoulders 22 are adapted to engage the adjacent inner faces of the arms 9 when the jaws are folded to their closed position for additionally limiting the inner movement of the arms 9, and thereby relieving the strain upon the free ends of said arms.

It is evident from the foregoing description and the accompanying drawings that when the jaws are suspended by the handle and the operating member 12 is moved to open the jaws the adjacent ends of the toggle-links will automatically move by gravity beyond a straight line drawn between the pivotal connections of said toggle-links to the arms 9 and that the adjusting-screw 23 on one of the links will engage the shoulder of the other link and positively lock the jaws in their open position.

The means for automatically closing the jaws preferably consists of oppositely-arranged spring-arms 24, having corresponding ends secured to the opposite faces of the shank or support 1, and their opposite free ends are engaged with the inner faces of the free ends of the arms 8 of the jaws, these spring-arms being normally tensioned outwardly from each other for forcing the jaws toward each other. It is apparent, therefore, that when the intermediate portion of the toggle connection strikes an obstruction, such as a fish, said intermediate portion will be moved toward the pivotal connections of the jaws beyond a straight line between the pivotal connections of the links of said toggle connection with the arms 9, and the springs 24 will automatically close said jaws upon the fish, and the adjacent ends of the arms or links of the toggle connection will be forced or folded upon the inner faces of the jaws, it being understood that when the said jaws are folded toward each other the spurs 10 enter the body of the fish and positively hold said fish from escape.

In the operation of my invention the operating-lever is moved in the direction indicated by the arrow a, thereby forcing the jaws open, the toggle connection moves automatically beyond the straight line drawn between its pivotal connections with the arms 9, thereby holding said arms in their open position, and the operating-lever is then returned to its normal position. (Indicated by dotted lines in Fig. 2.) When desired to grapple a fish or other similar object, the device is forced toward the object until the same comes in contact with the intermediate portion of the toggle connection, thereby forcing the adjacent ends of the toggle inwardly and releasing the jaws, whereupon the springs 24 automatically close the jaws and spurs upon the fish.

The operation of my invention will now be readily understood upon reference to the foregoing description and the accompanying drawings, and it will be noted that considerable change may be made in the detail construction and arrangement of the parts of my invention without departing from the spirit thereof. Therefore I do not limit myself to the precise construction and arrangement herein shown and described.

Having thus fully described my invention, what I claim, and desire to secure by Letters Patent, is—

1. A fish-grapple comprising a support, jaws pivotally mounted on the support and provided with spurs on their inner faces, means for automatically closing the jaws, a lever pivotally mounted on the support and provided with projecting studs, and links pivotally connected to the jaws and provided with slots for receiving the projecting studs for the purpose described.

2. A fish-grapple comprising a support, jaws pivotally mounted on the support and provided with curved arms having inwardly-projecting spurs, a toggle connecting the curved arms for the purpose described, springs for automatically closing the jaws, a lever pivotally connected to the support, and links pivotally connected to the jaws and to said lever at opposite sides of its pivot.

In witness whereof I have hereunto set my hand this 25th day of October, 1900.

JAMES P. PENNOCK.

Witnesses:
H. E. CHASE,
HOWARD P. DENISON.